(12) United States Patent
Salman (10) Patent No.: US 11,215,723 B2
(45) Date of Patent: Jan. 4, 2022

(54) DETERMINING SUBSURFACE LAYERS USING MACHINE LEARNING

(71) Applicant: Schlumberger Technology Corporation, Sugar Land, TX (US)

(72) Inventor: Nader Salman, Arlington, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 155 days.

(21) Appl. No.: 16/338,493

(22) PCT Filed: Oct. 18, 2016

(86) PCT No.: PCT/EP2016/074938
§ 371 (c)(1),
(2) Date: Apr. 1, 2019

(87) PCT Pub. No.: WO2018/072815
PCT Pub. Date: Apr. 26, 2018

(65) Prior Publication Data
US 2019/0250294 A1    Aug. 15, 2019

(51) Int. Cl.
*G01V 1/30*    (2006.01)
*G01V 1/28*    (2006.01)
(Continued)

(52) U.S. Cl.
CPC .............. *G01V 1/302* (2013.01); *G01V 1/28* (2013.01); *G06K 9/6256* (2013.01); *G06N 3/08* (2013.01); *G06T 7/73* (2017.01); *G01V 2210/64* (2013.01); *G01V 2210/643* (2013.01); *G06N 3/02* (2013.01); *G06T 2200/04* (2013.01);
(Continued)

(58) Field of Classification Search
CPC ...... G01V 1/302; G01V 1/28; G01V 2210/64; G01V 2210/643; G06T 7/73; G06T 2200/04; G06T 2207/10024; G06T 2207/20081; G06T 2207/20084; G06T 2207/30181; G06K 9/6256; G06N 3/08; G06N 2210/64; G06N 3/02
See application file for complete search history.

(56) References Cited

U.S. PATENT DOCUMENTS

| 6,574,565 | B1 * | 6/2003 | Bush | ........................ G01V 1/30 702/14 |
| 6,754,589 | B2 * | 6/2004 | Bush | ........................ G01V 1/30 702/13 |

(Continued)

OTHER PUBLICATIONS

"Caffe", retrieved at http://caffe.berkeleyvision.org/ on Mar. 18, 2019.

(Continued)

*Primary Examiner* — Manav Seth
(74) *Attorney, Agent, or Firm* — Colin L. Wier (57) ABSTRACT

A method is disclosed and includes receiving a seismic cube. The seismic cube includes a three-dimensional image of a portion of a subsurface area. The method further includes providing the seismic cube to a machine learning process. The machine learning process includes one or more neural networks used for predicting a location of a subsurface seismic layer in the received seismic cube. The method also includes receiving, from the machine learning process, the prediction of the location of the subsurface seismic layer in the seismic cube.

16 Claims, 6 Drawing Sheets

(51) Int. Cl.
  *G06T 7/73*   (2017.01)
  *G06K 9/62*   (2006.01)
  *G06N 3/08*   (2006.01)
  *G06N 3/02*   (2006.01)

(52) U.S. Cl.
  CPC .............. *G06T 2207/10024* (2013.01); *G06T 2207/20081* (2013.01); *G06T 2207/20084* (2013.01); *G06T 2207/30181* (2013.01)

(56) References Cited

U.S. PATENT DOCUMENTS

| | | | | |
|---|---|---|---|---|
| 6,996,470 | B2* | 2/2006 | Kamps | G01V 1/28 |
| | | | | 702/17 |
| 8,024,123 | B2* | 9/2011 | Priezzhev | G01V 1/301 |
| | | | | 702/11 |
| 8,213,261 | B2* | 7/2012 | Imhof | G01V 1/32 |
| | | | | 367/38 |
| 8,379,482 | B1* | 2/2013 | Khare | G01V 1/28 |
| | | | | 367/73 |
| 9,194,968 | B2* | 11/2015 | Imhof | G01V 1/30 |
| 9,702,996 | B2* | 7/2017 | Goggin | G01V 1/345 |
| 9,767,565 | B2* | 9/2017 | Estrada | G06K 9/6267 |
| 9,869,785 | B2* | 1/2018 | Dysvik | G01V 1/345 |
| 10,380,793 | B2* | 8/2019 | Salman | G01V 99/005 |
| 2002/0042677 | A1* | 4/2002 | West | G01V 1/32 |
| | | | | 702/14 |
| 2015/0135143 | A1* | 5/2015 | Dysvik | G01V 1/345 |
| | | | | 715/848 |
| 2016/0104317 | A1* | 4/2016 | Salman | G06T 17/05 |
| | | | | 345/420 |
| 2019/0169962 | A1* | 6/2019 | Aqrawi | E21B 41/00 |
| 2019/0383965 | A1* | 12/2019 | Salman | G01V 99/005 |
| 2019/0391295 | A1* | 12/2019 | Salman | G01V 99/005 |
| 2020/0278465 | A1* | 9/2020 | Salman | G01V 1/306 |
| 2020/0301036 | A1* | 9/2020 | Ramfjord | E21B 47/0025 |

OTHER PUBLICATIONS

Kingma, et al., "A Method for Stochastic Optimization," International Conference for Learning Representations, 2015.

Kou-Yuan, "Neural Network for Robust Recognition abf Seismic Patterns," Society of Exploration Geophysicists, SEG Technical Program Expanded Abstracts, Jan. 1, 1993.

Long, et al., "Fully Convolutional Networks for Semantic Segmentation," Computer Vision and Pattern Recognition (CVPR), 2015.

Medahl, et al., "Identifying Faults and Gas Chimneys Using Multiattributes and Neural Networks," The Leading Edge, Society of Exploration Geophysicists, US, vol. 20, No. 5, May 1, 2001.

"TensorFlow", retrieved at https://www.tensorflow.org/ on Mar. 18, 2019.

Yong, et al., "Seismic image recognition tool via arlificial neural network," 2013 IEEE 14th International Symposium on Computational Intelligence and Informatics (CINTI), IEEE, Nov. 19, 2013, pp. 399-404.

Zhihong, et al., "Multi-Attributes and Neural Network-Based Fault Detection in 3D Seismic Interpretation," Advanced Materials Research, vol. 838-841, Nov. 8, 2013, pp. 1497-1502.

International Search Report and Written Opinion for the equivalent International patent application PCT/EP2016/074938 dated Jul. 10, 2017.

International Preliminary Report on Patentability for the equivalent International patent application PCT/EP2016/074938 dated May 2, 2019.

Communication pursuant to Article 94(3) EPC dated Nov. 30, 2020 in corresponding European Patent Application No. 16782074.5 (10 pages).

* cited by examiner

DETERMINING SUBSURFACE LAYERS USING MACHINE LEARNING

FIELD

This invention relates to determining a seismic subsurface layer and more particularly relates to determining a seismic subsurface layer using machine learning.

BACKGROUND

Determining locations or boundaries of subsurface layers can be useful for selecting drilling locations for extracting various resources for the subsurface. Furthermore, different subsurface layers can be indicators for different types of resources that may be present around the subsurface layers. Accordingly, being able to drill in as precise location as possible depends on the accuracy of determining the locations of the subsurface layers.

SUMMARY

An apparatus, method, system, and program product are disclosed for determining subsurface layers using machine learning. A seismic cube of a three-dimensional image of a portion of a subsurface area is received. The seismic cube is provided to a machine learning process that includes one or more neural networks that are used for predicting a location of a subsurface seismic layer in the received seismic cube. The prediction of the location of the subsurface seismic layer in the seismic cube is received from the machine learning process.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
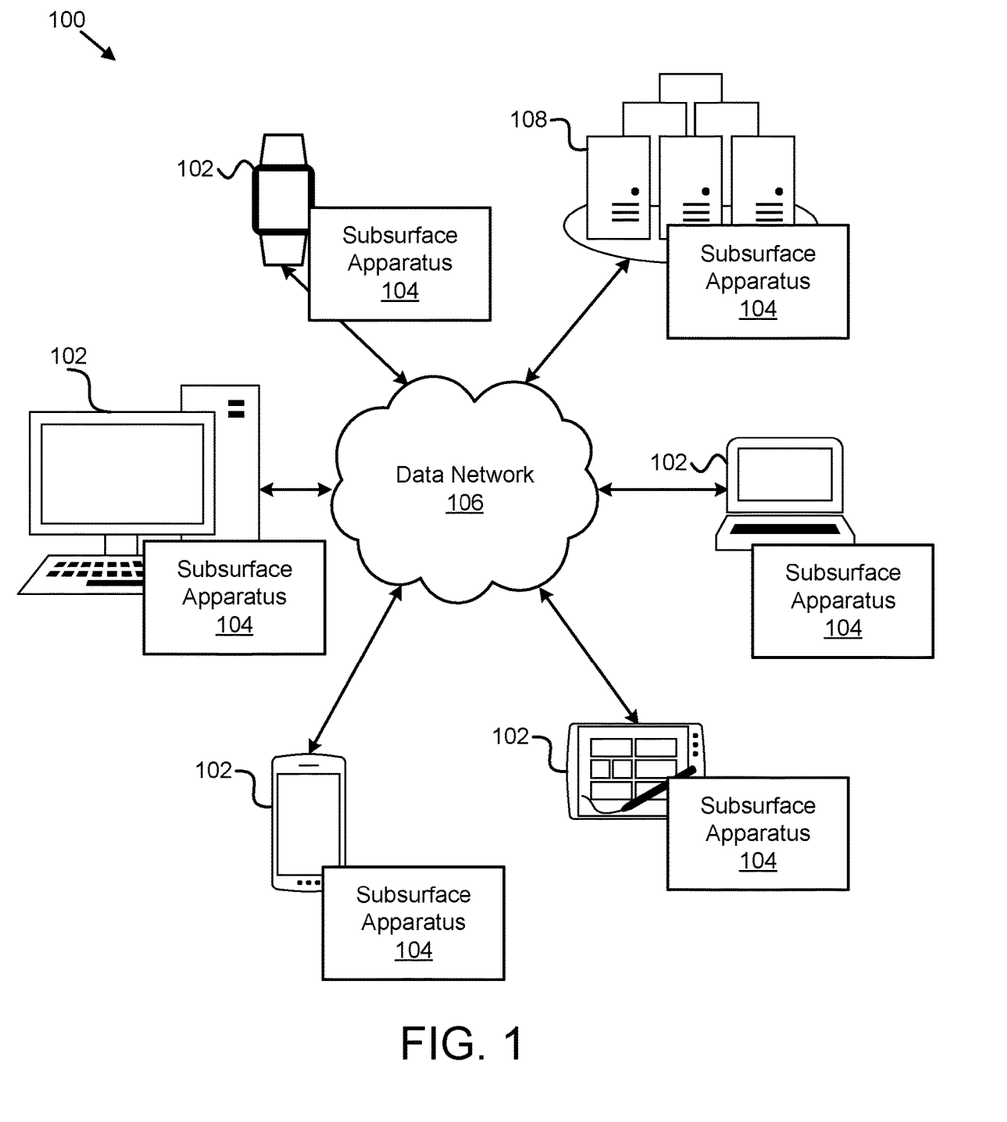
FIG. 1 is a schematic block diagram illustrating one embodiment of a system for determining a subsurface layers using machine learning.

FIG. 1 depicts one embodiment of a system 100 for determining subsurface layers using machine learning. In one embodiment, the system 100 includes one or more information handling devices 102, one or more subsurface apparatuses 104, one or more data networks 106, and one or more servers 108. In certain embodiments, even though a specific number of information handling devices 102, subsurface apparatuses 104, data networks 106, and servers 108 are depicted in FIG. 1, one of skill in the art will recognize, in light of this disclosure, that any number of information handling devices 102, subsurface apparatuses 104, data networks 106, and servers 108 may be included in the system 100.

In one embodiment, the system 100 includes one or more information handling devices 102. The information handling devices 102 may include one or more of a desktop computer, a laptop computer, a tablet computer, a smart phone, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more other information handling devices 102 and/or to one or more servers 108 over a data network 106, described below. The information handling devices 102, in a further embodiment, are configured to execute various programs, program code, applications, instructions, functions, and/or the like, which may access, store, download, upload, and/or the like data located on one or more servers 108.

In one embodiment, the subsurface apparatus 104 is configured to determine a location, e.g., a boundary, a depth, and/or the like, of a subsurface seismic layer, which may be used to determine an optimal or appropriate location for drill placement to drill for a resource, e.g., oil, water, or the like. The subsurface apparatus 104, in one embodiment, receives a seismic cube that is a three-dimensional image of a portion of a subsurface area. The subsurface apparatus 104, in a further apparatus, provides the seismic cube to a machine learning process. The machine learning process may include one or more neural networks for predicting a location of a subsurface seismic layer in the received seismic cube. In certain embodiments, the subsurface apparatus 104 receives, from the machine learning process, the prediction of the location of the subsurface seismic layer in the seismic cube. The subsurface apparatus 104, including its various sub-modules, may be located on one or more information handling devices 102 in the system 100, one or more servers 108, one or more network devices, and/or the like. The subsurface apparatus 104 is described in more detail below with reference to FIGS. 2 and 3.

The subsurface apparatus 104, in one embodiment, improves upon current drilling technology because it more accurately and efficiently predicts the locations, boundaries, edges, flanks, and/or the like of various subsurface seismic layers, such as salt layers or other sedimentary layers using machine learning processes. Based on the predicted locations of the subsurface seismic layers, an appropriate location for a drill can be determined so that a resource associated with the subsurface seismic layer can be extracted, such as oil located beneath a subsurface salt layer. Using machine learning algorithms and processes provides accurate predictions of the locations of the subsurface layers in an effective and efficient manner that cannot be achieved without the use of the machine learning processes.

In various embodiments, the subsurface apparatus 104 may be embodied as a hardware appliance that is hard-wired to perform the various functions described below, and which can be installed or deployed on an information handling device 102, on a server 108, or elsewhere on the data network 106. In certain embodiments, the subsurface apparatus 104 may include a hardware device such as a secure hardware dongle or other hardware appliance device (e.g., a set-top box, a network appliance, or the like) that attaches to a device such as a laptop computer, a server 108, a tablet computer, a smart phone, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the subsurface apparatus 104 may include a power interface, a wired and/or wireless network interface, a graphical interface that attaches to a display, and/or a semiconductor integrated circuit device as described below, configured to perform the functions described herein with regard to the subsurface apparatus 104.

The subsurface apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the subsurface apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the subsurface apparatus 104.

The semiconductor integrated circuit device or other hardware appliance of the subsurface apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the subsurface apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("M RAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The one or more servers 108, in one embodiment, may be embodied as blade servers, mainframe servers, tower servers, rack servers, and/or the like. The one or more servers 108 may be configured as a mail server, a web server, an application server, an FTP server, a media server, a data server, a web server, a file server, a virtual server, and/or the like. The one or more servers may include local servers, remote servers, clout servers, and/or the like. The one or more servers 108 may be communicatively coupled (e.g., networked) over a data network 106 to one or more information handling devices 102. The one or more servers 108 may store and/or process data associated with determining a location of a subsurface layer, such as machine learning algorithms and data, imaging algorithms and data, and/or the like. The one or more servers 108, as described in more detail below, may be communicatively coupled to form a neural network, such as a convolution neural network, that is used as part of the machine learning process.

Figure 2:
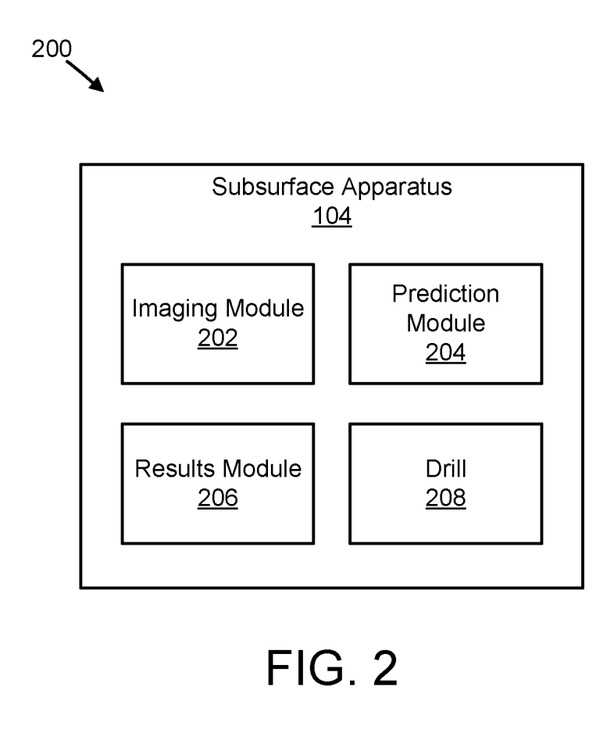
FIG. 2 is a schematic block diagram illustrating one embodiment of an apparatus for determining a subsurface layers using machine learning.

FIG. 2 is a schematic block diagram illustrating one embodiment of an apparatus 200 for determining subsurface layers using machine. In one embodiment, the apparatus 200 includes an embodiment of a subsurface apparatus 104. The subsurface apparatus 104, in some embodiments, includes one or more of an imaging module 202, a prediction module 204, a results module 206, and a drill 208, which are described in more detail below.

The imaging module 202, in one embodiment, receives a seismic cube. A seismic cube, as used herein, is a three-dimensional image having a plurality of voxels that depict a portion of a subsurface area. For example, a seismic cube may be a three-dimension image of a subsurface area captured from the surface with a three-dimensional imaging device, e.g., a tomography system such as magnetic resonance imaging ("MRI"), computed tomography ("CT"), single-photon emission CT ("SPECT"), electrical resistivity tomography ("ERT"), positron emission tomography ("PET"), electronic tomography, magnetic particle imaging, and/or the like. In one embodiment, the imaging module 202 receives the seismic cube from a tomography system, a user, and/or the like.

The seismic cube that the imaging module 202 receives may include one or elements, boundaries, structures, or the like of a subsurface layer of interest. For example, the seismic cube may include structures and boundaries of a subsurface salt layer body. These salt bodies (together with their surrounding sediments) are often diffused, poorly contrasted, and "ghost" like structures, i.e. missing flanks or substantially vertical boundaries. This may be due to the seismic wave propagation properties that makes salt bodies difficult to automatically segment. The other difficulty is that subsurface salt bodies may appear anywhere in a seismic cube in almost any shape and size. Subsurface salt are infiltrative types of bodies that have different physical properties than their surrounding sediments. Their physical properties are such that seismic waves tend to propagate at higher velocities in them than the surrounding sediments. Thus, the flanks of the salt bodies may appear fuzzy and hard to distinguish from their surroundings. Use of machine learning algorithms may improve the accuracy with which the flanks of the salt bodies, and other subsurface seismic layers, can be predicted.

The prediction module 204, in one embodiment, provides the seismic cube that the imaging module 202 received to a machine learning process. As used herein, a machine learning process may comprise an algorithm, system, and/or device that is programmed to learn from and make predictions on data. Machine learning processes may operate by building a model from example inputs or training data, described below, in order to make data-driven predictions or decisions.

The machine learning process that the prediction module 204 uses may include a neural network. As used herein, a neural network is a type of machine learning that can use a plurality of computing devices or processes to estimate or approximate functions that can depend on a large number of inputs that are generally unknown. In one embodiment, prediction module 204 utilizes a convolution neural network to predict a location of a subsurface seismic layer based on the seismic cube that the imaging module 202 received.

In one embodiment, the results module 206 receives the prediction of the location of the subsurface seismic layer in the seismic cube from the machine learning process. The prediction may include a generated seismic cube that corresponds to the received seismic cube that includes a depiction of the predicted location of the subsurface seismic layer. For example, the results module 206 may receive a seismic cube image that the machine learning process generated that outlines, depicts, shows, or the like the different boundaries, structures, edges, flanks, and/or the like of a subsurface layer or body of salt. The prediction may include one or more sections of a seismic cube, e.g., two-dimensional images, of the subsurface seismic layer.

Based on the results, an appropriate location for a drill 208 may be determined that allows the drill 208 to drill through, to, or around the predicted location of the subsurface seismic layer to extract resources of interest, such as oil, water, and/or the like. The drill 208, in one embodiment, may be a vertical drill. In another embodiment, the drill 208 is a horizontal drill used to drill a horizontal well at the selected location of the potential drill site. The drill 208 may be any drill configured to drill horizontally along a rock layer, for example, to reach reservoirs that cannot be reached by vertical or directional drilling, or the like. The drill 208 may be used to drill a horizontal well for a horizontal reservoir containing oil, gas, water, and/or other resources using hydraulic fracturing to create a horizontal wellbore.

Figure 3:
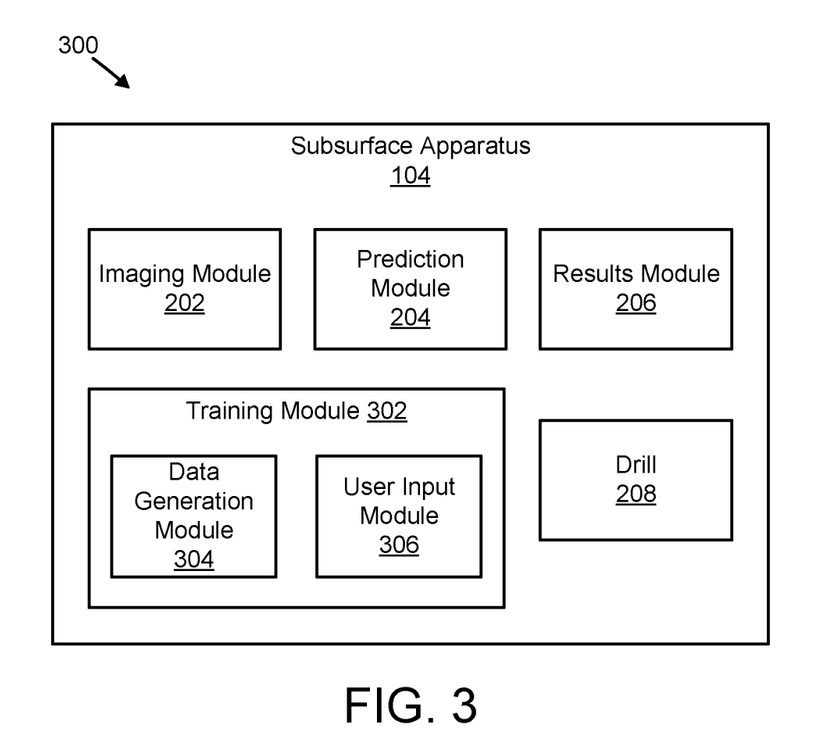
FIG. 3 is a schematic block diagram illustrating one embodiment of another apparatus for determining a subsurface layers using machine learning.

FIG. 3 is a schematic block diagram illustrating one embodiment of an apparatus 300 for determining subsurface layers using machine. In one embodiment, the apparatus 300 includes an embodiment of a subsurface apparatus 104. The subsurface apparatus 104, in some embodiments, includes one or more of an imaging module 202, a prediction module 204, a results module 206, and a drill 208, which may be substantially similar to the imaging module 202, the prediction module 204, the results module 206, and the drill 208 described above with reference to FIG. 2. In a further embodiment, the subsurface apparatus 104 includes a training module 302, which may include one or more of a data generation module 304 and a user input module 306, which are described below in more detail.

The training module 302, in one embodiment, trains the machine learning process using a training data set. For example, the training data set for the machine learning process described herein may include a plurality of image sections of one or more seismic cubes. An image section, as used herein, is a two-dimension image or slice of a portion of a seismic cube. Thus, the training data set may include seismic cubes representing portions of various subsurface areas, and each seismic cube may be divided, split, or otherwise sliced into a plurality of sections, where each section is a two-dimensional image.

In one embodiment, the training module 302 invokes the data generation module 304 to generate the training data set. In some embodiments, the data generation module 304 receives a seismic cube for a subsurface area of interest. The data generation module 304 may slice the seismic cube into a plurality of sections, where each section is a two-dimensional image.

For each image section, the data generation module 304 may iteratively generate intermediate image sections, based on the original image section. For example, the data generation module 304 may further process the original image section, using a tomography system, to further refine the features of the original image section, such as the boundaries or edges of various subsurface seismic layers. In various embodiments, at each iteration, the data generation module 304 may incorporate or include user input, such as input from a petro-technical expert based on his study of the previously generated image sections.

Accordingly, the data generation module 304 may iteratively generate a plurality of intermediate image section that are each based on the previously generated image and/or user input, starting with the original image section, until a threshold is satisfied. The threshold, for example, may be a predetermined number of iterations, a predetermined resolution, and/or the like. In such an embodiment, because each intermediate image section is different at each iteration (e.g., has different pixel values), each intermediate image section, and consequently each subsurface structure, has a unique signature.

The data generation module 304, in one embodiment, generates a final image or image section based on the original image section and one or more of the intermediate image sections. In some embodiments, the final image includes a plurality of channels for each pixel of the final image. An example of a channel is a color channel for a color image. For example, each pixel of a color image may have a red channel for storing values describing the "redness" of the image, a green channel for storing values describing the "greenness" of the image, and a blue channel for storing values associated with the "blueness" of the image. Other channels may include a brightness channel, a contrast channel, and/or the like.

In such an embodiment, each channel of a pixel of the final image may include a value corresponding to a pixel value of the first image section and each of the one or more intermediate image sections. In another embodiment, each of the plurality of channels for each pixel of the final image includes a grayscale value of a corresponding pixel in the first image section and the one or more intermediate image sections.

For example, if the final image has three channels, such as the RGB color channels described above, and the final image is 50×50 pixels, then the red color channel for the first pixel in the 50×50 pixel final image may be the grayscale value of the corresponding first pixel in the original image section, the blue color channel for the first pixel may be the grayscale value of the corresponding first pixel in an intermediate image, and the green color channel for the first pixel may be the grayscale value of the corresponding first pixel of the last of final intermediate image that is generated, e.g., the last image generated before the threshold was satisfied.

In this manner, multiple image sections, at various iterations, can be encoded or "stacked" in a single image of the training data. This provides the training data for the machine learning process with a deeper and more detailed training data set, which allows the machine learning process to generate more accurate and effective prediction results for a location of a subsurface seismic layer. Even though only three channels are described above, e.g., the RGB color channels, any number of channels may be used, with each channel representing an image at a different iteration generated by the tomography system.

In another embodiment, if a plurality of intermediate image sections is generated by the tomographic system, but the number of channels for storing image section data is less than the number of generated intermediate image sections, then the data generation module 304 may select the median intermediate image section, or every other intermediate image section, or the like for the middle channels, while the first channel is for the first image section (e.g., the original image section) and the last channel is for the last generated intermediate image section. For example, if five total image sections are generated, the first image section and four intermediate image sections, but only three channels are available, the data generation module 304 may select the first image section for the first channel, the second intermediate image section for the second channel, and the last (or fourth) intermediate image section for the third channel. In this manner, the training data for the machine learning process may contain different features, resolutions, highlights, and/or the like, that may be useful for predicting the locations or features of different subsurface seismic layers.

The user input module 306, in one embodiment, receives user input associated with an intermediate image section prior to generating another iteration of an intermediate image. The data generation module 304 may provide the user input to a tomography system for use in generating the next iteration of the intermediate image section. For example, the user input module 306 may receive input from petro-technical experts regarding various features, segments, structures, and/or the like of a particular intermediate image section. The experts, for example, may specify various points of interest, such as locations or points where a layer boundary may exist, where a different seismic material body may be present, and/or the like. The data generation module 304 may provide the user-input to a tomography system to be used during processing of the next iteration of the intermediate image section.

Figure 4:
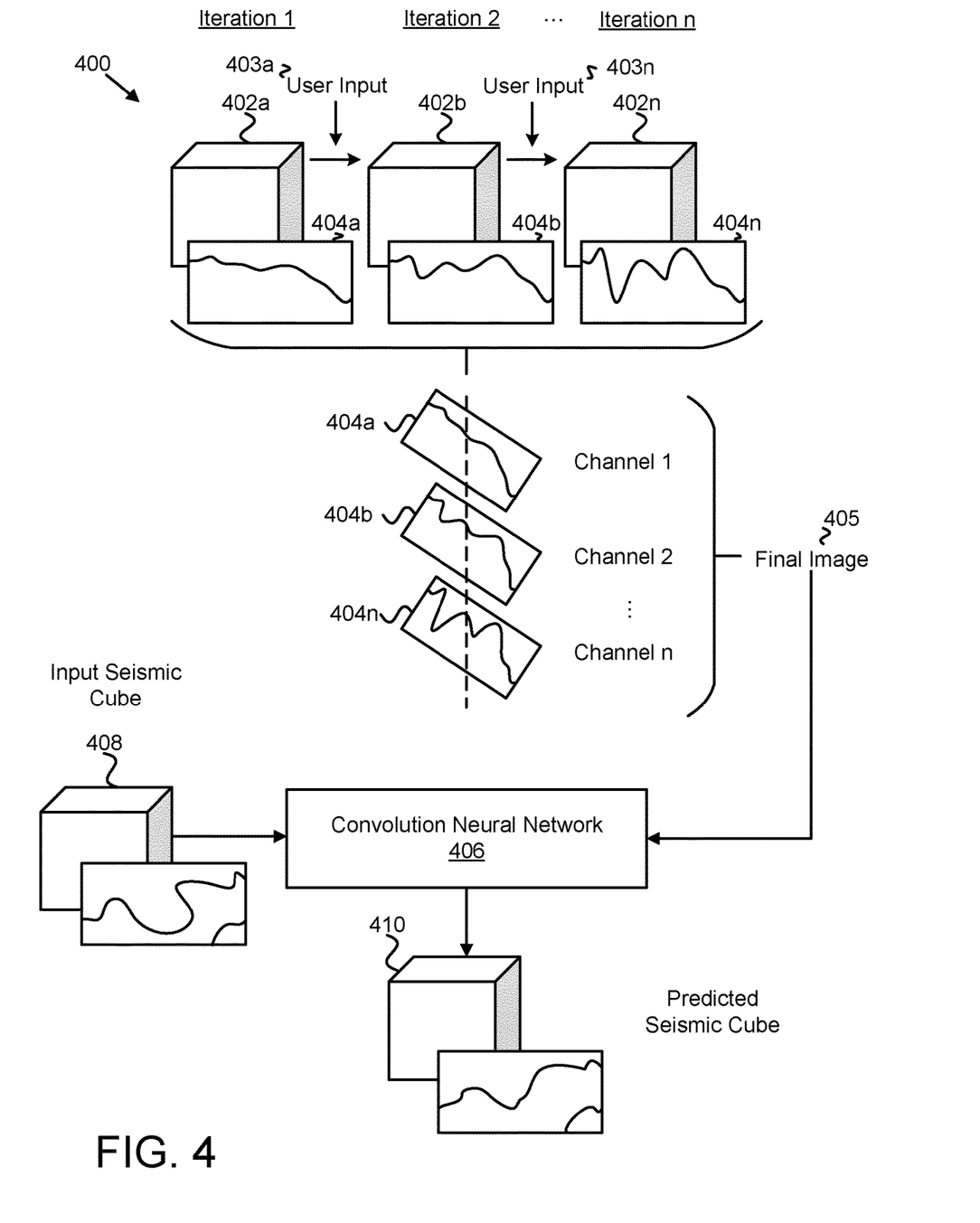
FIG. 4 is a schematic block diagram illustrating one example embodiment of determining a subsurface layers using machine learning.

FIG. 4 depicts one example embodiment 400 for determining subsurface layers using machine learning. In one embodiment, a seismic cube 402a is generated and the data generation module 304 generates one or more image sections 404a from the seismic cube 402a. The user input module 306 may also receive user input 403a-n from a user such as a petro-technical expert, which may be used to generate the next iteration of seismic cubes 402b-n and intermediate image sections 404b-n of the intermediate seismic cubes 402b-n. The data generation module 304 may continue iteratively generating intermediate image sections 404b-n until a threshold is satisfied, until a user manually stops the process, or the like.

In one embodiment, the first or original image section 404a, an intermediate image section 404b, and the intermediate image section for the final iteration 404n are each stored in a channel of a final image 405. For example, the first image section 404a may be stored in the red color channel of the final image 405, the intermediate image section 404b may be stored in the blue color channel of the final image 405, and the intermediate image section for the final iteration 404n may be stored in the green color channel of the final image 405.

The training module 302 may provide the final image 405, or a seismic cube comprising a plurality of final images 405 corresponding to each section 402a of the original seismic cube 402a, to the convolution neural network 406, where it can be used to train the convolution neural network to recognize, predict, forecast, and/or the like locations of subsurface seismic layers or bodies, such as salt layers, sedimentary layers, oil layers, water layers, and/or the like.

For example, the imaging module 202 may receive a seismic cube of a subsurface area 408 and the prediction module 206 may provide the seismic cube to the convolution neural network 406. Because the convolution neural network has been trained using various iterations of tomographic processing, e.g., various iterations of image sections of a seismic cube, the convolution neural network 406 may be capable of receiving and processing a seismic cube 408 that has also been processed at various iterations. The seismic cube 408 may be a seismic cube of the original image, may have been processed a number of times by a tomography system, and/or the like. The convolution neural network may process the seismic cube 408, based on the generated training data, to determine one or more predictions for the location of the subsurface seismic layer of interest and generate a predicted seismic cube 410.

Figure 5:
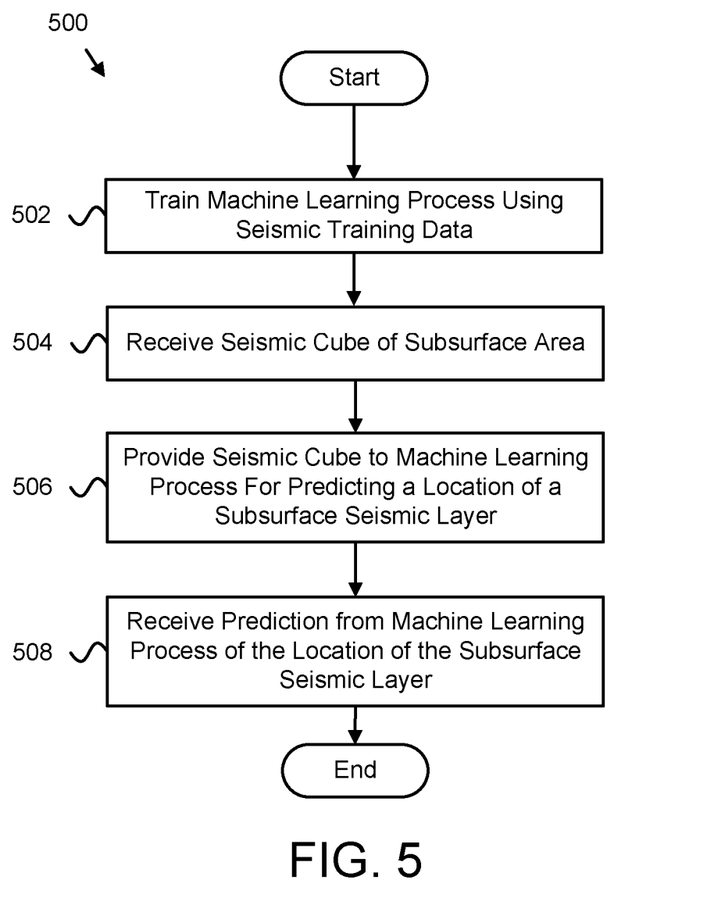
FIG. 5 is a schematic flow chart diagram illustrating one embodiment of a method for determining a subsurface layers using machine learning.

FIG. 5 depicts a schematic flow chart diagram of one embodiment of a method 500 for determining subsurface layers using machine learning. In one embodiment, the method 500 begins, and trains 502 a machine learning process using a training data set. The training data set may include a plurality of image sections of one or more seismic cubes. The method 500, in a further embodiment, receives 504 a seismic cube of a subsurface area to be processed by the machine learning process in order to determine or predict a location of a subsurface seismic layer of the seismic cube.

In some embodiments, the method 500 provides 506 the seismic cube to the machine learning process, which may include one or more neural networks such as a convolution neural network. The method 500, in one embodiment, receives 508 the results of the machine learning process that contain one or more predictions for the location of the subsurface seismic layer, and the method 500 ends. In various embodiments, the training module 304, the imaging module 202, the prediction module 204, and/or the results module 206 perform the various steps of the method 500.

Figure 6:
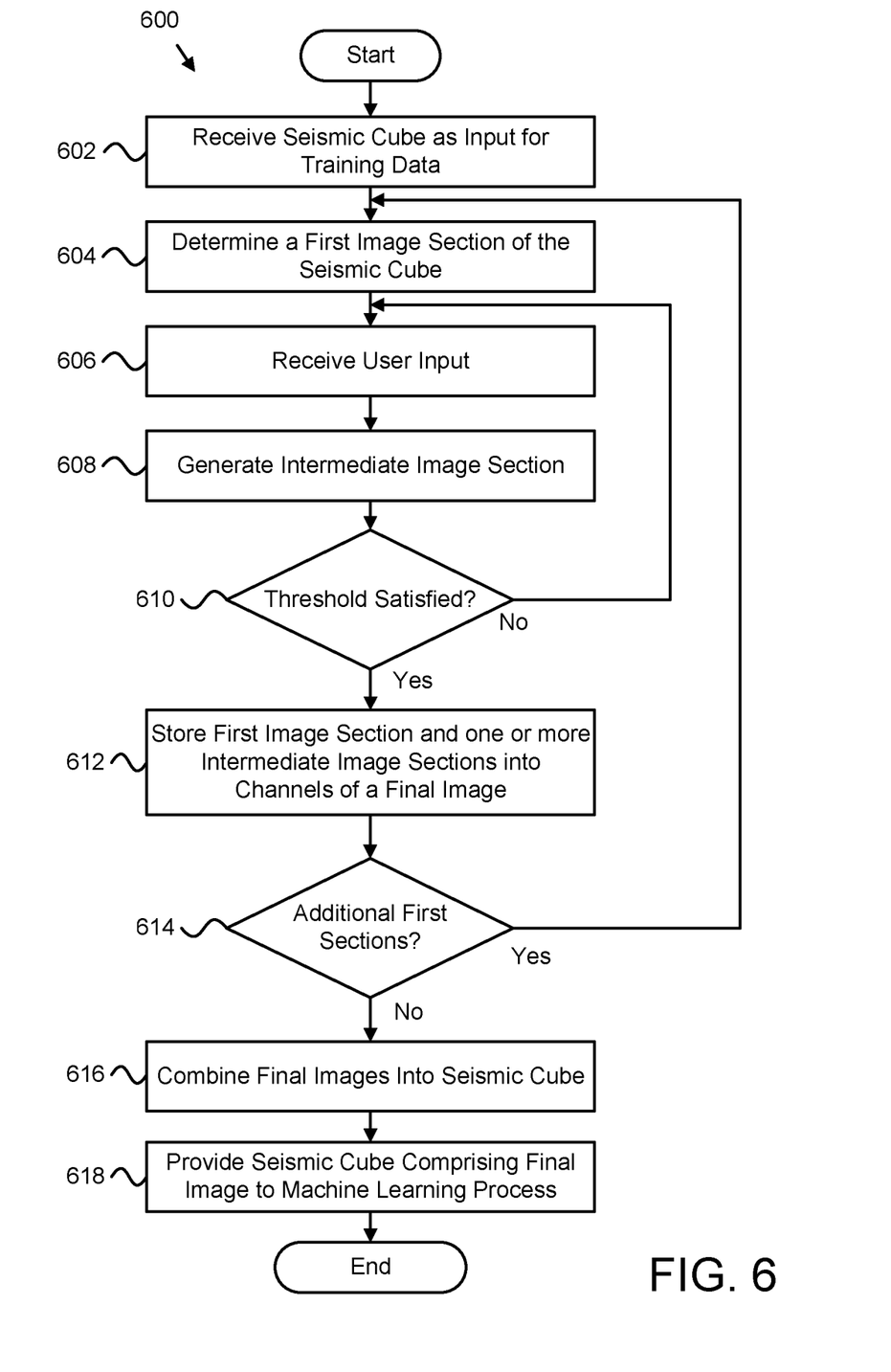
FIG. 6 is a schematic flow chart diagram illustrating one embodiment of a method for generating a training data set for a machine learning process.

FIG. 6 depicts a schematic flow chart diagram of one embodiment of a method 600 for generating a training data set for a machine learning process. In one embodiment, the method 600 begins, and receives 602 a seismic cube of a subsurface seismic area. The method 600, in a further embodiment, determines 604 a first image section or slice of the seismic cube. The method 600, in some embodiments, receives 606 user input associated with the first section of the seismic cube and generates 608 an intermediate image section based on the first image section and the user input.

The method 600, in some embodiments, determines 610 whether a predetermined threshold has been satisfied, such as a number of iterations, an image resolution, and/or the like. If not, the method 600 begins a new iteration by receiving 606 user input associated with a previously generated intermediate image section and generates 608 a new intermediate image section until the threshold is satisfied.

The method 600, in some embodiments, stores 612 the first image section, one or more intermediate image sections, and the final intermediate image section that satisfied the threshold, in one or more channels of a final image. The method 600, in one embodiment, determines 614 whether there are additional image sections to process from the original seismic cube. If so, the method 600 determines 604 another image section of the original seismic cube and iteratively generates intermediate image sections. If all of the image sections for the seismic cube have been processed, the method 600, in certain embodiments, combines 616 all of the generated final images into a final seismic cube. The method 600, in some embodiments, provides 618 the final seismic cube to the machine learning process to train the machine learning process, and the method 600 ends.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

The claims below do not invoke the "means-plus-function" provisions of 35 U.S.C. § 112 unless the claim includes the words "means for."

Although the preceding description has been described herein with reference to particular means, materials and embodiments, it is not intended to be limited to the particulars disclosed herein; rather, it extends to all functionally equivalent structures, methods and uses, such as are within the scope of the appended claims.

The invention claimed is:

1. A method comprising:
  generating a training data set, the generating the training data set further comprising:

receiving a first seismic cube,
  determining a first image section of the first seismic cube,
  generating one or more intermediate image sections based on the first image section, and
  generating a final image for the training data set that corresponds to the first image section as a combination of the first image section and the one or more intermediate image sections;
training a machine learning process using the training data set, the training data set comprising a plurality of image sections of one or more seismic cubes, wherein an image section comprises a two-dimensional image of a portion of a seismic cube of the one or more seismic cubes:
receiving a second seismic cube, the second seismic cube comprising a three-dimensional image of a portion of a subsurface area;
providing the second seismic cube to the machine learning process, the machine learning process comprising one or more neural networks used for predicting a location of a subsurface seismic layer in the received second seismic cube; and
receiving, from the machine learning process, the prediction of the location of the subsurface seismic layer in the second seismic cube.

2. The method of claim 1, wherein the final image comprises a plurality of channels for each pixel of the final image, each channel of a pixel comprising a value corresponding to a pixel value of the first image section and each of the one or more intermediate image sections used to generate the final image.

3. The method of claim 2, wherein each of the plurality of channels for each pixel of the final image comprises a grayscale value of a corresponding pixel in the first image section and the one or more intermediate image sections.

4. The method of claim 2, wherein the plurality of channels for each pixel of the final image comprises a plurality of color channels for each pixel, the color channels comprising one or more of a red color channel, a green color channel, and a blue color channel.

5. The method of claim 4, wherein the red color channel for each pixel in the final image comprises a grayscale pixel value corresponding to each pixel in the first image section, the green color channel for each pixel in the final image comprises a grayscale pixel value corresponding to each pixel in an intermediate image section, and the blue color channel for each pixel in the final image comprises a grayscale pixel value corresponding to each pixel in a final intermediate image section that is generated.

6. The method of claim 1, wherein the one or more intermediate image sections are iteratively generated until a predetermined threshold is satisfied, each intermediate image section generated based on the first image section and one or more previously generated intermediate image sections.

7. The method of claim 6, further comprising receiving user input associated with an intermediate image section prior to generating another iteration of an intermediate image section, the intermediate image section further generated based on the user input.

8. The method of claim 1, wherein a plurality of first image sections are determined for the first seismic cube and a final image is generated for each of the first image sections.

9. The method of claim 1, wherein the subsurface seismic layer comprises a subsurface salt layer.

10. The method of claim 1, wherein the neural network for the machine learning process comprises a convolution neural network ("CNN").

11. An apparatus comprising:
  a processor;
  a memory that stores code executable by the processor to:
    receive a first seismic cube;
    determine a first image section of the first seismic cube;
    generate one or more intermediate image sections based on the first image section;
    generate a final image for a training data set that corresponds to the first image section as a combination of the first image section and the one or more intermediate image sections;
    train a machine learning process using the training data set, the training data set comprising a plurality of image sections of one or more seismic cubes, wherein an image section comprises a two-dimensional image of a portion of a seismic cube of the one or more seismic cubes;
    receive a second seismic cube, the second seismic cube comprising a three-dimensional image of a portion of a subsurface area;
    provide the second seismic cube to the machine learning process, the machine learning process comprising one or more neural networks used for predicting a location of a subsurface seismic layer in the received second seismic cube; and
    receive, from the machine learning process, the prediction of the location of the subsurface seismic layer in the second seismic cube.

12. The apparatus of claim 11, wherein the final image comprises a plurality of channels for each pixel of the final image, each channel of a pixel comprising a value corresponding to a pixel value of the first image section and each of the one or more intermediate image sections used to generate the final image.

13. The apparatus of claim 12, wherein each of the plurality of channels for each pixel of the final image comprises a grayscale value of a corresponding pixel in the first image section and the one or more intermediate image sections.

14. The apparatus of claim 12, wherein the plurality of channels for each pixel of the final image comprises a plurality of color channels for each pixel, the color channels comprising one or more of a red color channel, a green color channel, and a blue color channel.

15. The apparatus of claim 11, wherein the one or more intermediate image sections are iteratively generated until a predetermined threshold is satisfied, each intermediate image section generated based on the first image section and one or more previously generated intermediate image sections.

16. A program product comprising a computer readable storage medium that stores code executable by a processor, the executable code comprising code to perform:
  receiving a first seismic cube;
  determining a first image section of the first seismic cube;
  generating one or more intermediate image sections based on the first image section;
  generating a final image for a training data set that corresponds to the first image section as a combination of the first image section and the one or more intermediate image sections;
  training a machine learning process using the training data set, the training data set comprising a plurality of image sections of one or more seismic cubes, wherein an image section comprises a two-dimensional image of a portion of a seismic cube of the one or more seismic cubes:

receiving a second seismic cube, the second seismic cube comprising a three-dimensional image of a portion of a subsurface area;

providing the second seismic cube to the machine learning process, the machine learning process comprising one or more neural networks used for predicting a location of a subsurface seismic layer in the received second seismic cube; and receiving, from the machine learning process, the prediction of the location of the subsurface seismic layer in the second seismic cube.

\* \* \* \* \*